US007151557B2

(12) United States Patent
Boyatt, III et al.

(10) Patent No.: US 7,151,557 B2
(45) Date of Patent: Dec. 19, 2006

(54) COLLIMATION ASSEMBLY FOR ADJUSTING LASER LIGHT SOURCES IN A MULTI-BEAMED LASER SCANNING UNIT

(75) Inventors: Richard G. Boyatt, III, Lexington, KY (US); Roger S. Cannon, Nicholasville, KY (US); Philip J. Heink, Lexington, KY (US); Danny W. Peters, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 358 days.

(21) Appl. No.: 10/805,059

(22) Filed: Mar. 19, 2004

(65) Prior Publication Data

US 2005/0206717 A1 Sep. 22, 2005

(51) Int. Cl.
*B41J 2/47* (2006.01)
*H01S 3/08* (2006.01)
*G02B 26/08* (2006.01)

(52) U.S. Cl. ...................... 347/252; 372/101; 372/108; 359/196; 359/205

(58) Field of Classification Search ................ 347/252; 372/101, 108; 359/196, 205; 374/252
See application file for complete search history.

(56) References Cited

U.S. PATENT DOCUMENTS 4,342,504 A 8/1982 Ebner
4,424,523 A 1/1984 Snelling et al.
4,424,524 A 1/1984 Daniele
4,427,275 A 1/1984 Stalzer
4,435,064 A 3/1984 Tsukada et al.
4,536,778 A 8/1985 De Schamphelaere
4,549,784 A 10/1985 Inokuchi
4,672,400 A 6/1987 Doggett
4,821,051 A 4/1989 Hediger
4,851,862 A 7/1989 Newman et al.
4,875,153 A 10/1989 Hons
4,904,862 A 2/1990 Bertagne (Continued)

FOREIGN PATENT DOCUMENTS

JP 2004034608 * 2/2004

OTHER PUBLICATIONS

English abstract of JP2004034608 (along with computer translation of JP2004034608).*

(Continued)

*Primary Examiner*—Hai Pham
*Assistant Examiner*—Carlos A. Martinez
(74) *Attorney, Agent, or Firm*—Stevens & Showalter

(57) ABSTRACT

A collimation assembly for a multi-beamed laser scanner including a collimation housing mounted to a printhead housing of the laser scanner, and at least two adjustment brackets supported on the collimation housing and located adjacent to each other in a cross-scan direction. Each of the adjustment brackets includes a mount member and a laser light source is supported within each of the mount members, each of the light sources defining a respective light beam axis. At least two collimation lenses are also provided supported on the collimation housing and intersected by one of the light beam axes. Each of the adjustment brackets is movable relative to the collimation housing in a scan direction and in the cross-scan direction to locate each of the light beam axes at a predetermined position relative to a respective collimation lens. Each of the laser light sources is additionally adjustable in the process direction, parallel to the light beam axes, to adjust the distance between the laser light sources and the collimation lenses.

18 Claims, 6 Drawing Sheets

U.S. PATENT DOCUMENTS

| | | | | |
|---|---|---|---|---|
| 5,036,339 | A | 7/1991 | Hediger | |
| 5,157,249 | A | 10/1992 | Hashimoto | |
| 5,196,866 | A | 3/1993 | Fershl et al. | |
| 5,291,248 | A | 3/1994 | Isobe | |
| 5,430,549 | A | 7/1995 | Anderson | |
| 5,432,535 | A | 7/1995 | Andrews et al. | |
| 5,471,236 | A | 11/1995 | Ito | |
| 5,485,190 | A | 1/1996 | Koetter et al. | |
| 5,515,097 | A | 5/1996 | Munechika et al. | |
| 5,578,818 | A | 11/1996 | Kain et al. | |
| 5,633,761 | A * | 5/1997 | Takashima et al. | 359/811 |
| 5,668,587 | A | 9/1997 | Hammond et al. | |
| 5,717,451 | A | 2/1998 | Katano et al. | |
| 5,764,272 | A | 6/1998 | Sarraf | |
| 5,771,061 | A | 6/1998 | Komurasaki et al. | |
| 5,818,499 | A | 10/1998 | Orlicki et al. | |
| 5,969,843 | A * | 10/1999 | Naiki et al. | 359/196 |
| 6,025,858 | A | 2/2000 | Tanioka et al. | |
| 6,115,056 | A | 9/2000 | Eshed | |
| 6,124,924 | A | 9/2000 | Feldman et al. | |
| 6,181,363 | B1 | 1/2001 | Satoh | |
| 6,343,092 | B1 * | 1/2002 | Naoe et al. | 372/108 |
| 2004/0047389 | A1 * | 3/2004 | Cannon et al. | 372/101 |
| 2004/0223203 | A1 * | 11/2004 | Kasai et al. | 359/205 |

OTHER PUBLICATIONS

U.S. Appl. No. 11/114,623, filed Apr. 26, 2005, Dodds—entitled Collimation Assembly With an Adjustment Bracket Capable of Flexing When Receiving a Light Source (pending application).

* cited by examiner

COLLIMATION ASSEMBLY FOR ADJUSTING LASER LIGHT SOURCES IN A MULTI-BEAMED LASER SCANNING UNIT

BACKGROUND OF THE INVENTION

1. Field of the Invention

The present invention relates to an electrophotographic imaging apparatus, and more particularly, to a compact collimation assembly providing for alignment of adjacent laser light sources relative to collimation lenses in an electrophotographic imaging apparatus.

2. Description of Related Prior Art

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium such as paper is given an electrostatic charge opposite that of the toner and is passed close to the drum surface. As the medium passes the drum, the toner is pulled onto the surface of the medium in a pattern corresponding to the latent image written to the drum surface. The medium then passes through a fuser that applies heat and pressure thereto. The heat causes constituents including the thermoplastic components of the toner to melt and flow into the interstices between the fibers of the medium and the fuser pressure promotes settling of the toner constituents in these voids. As the toner is cooled, it solidifies and adheres the image to the medium.

Further, color laser printers typically employ one light source and optical path for each of a plurality of latent images to be simultaneously formed on the drum. For a color tandem printer, four distinct laser scanning units are typically required, each with its own laser diode light source, polygonal scanning mirror and associated motor, and optical system. Generally, the largest and most costly components of laser scanner units are the motors for driving the polygonal mirrors and the lens sets. Accordingly, in order to reduce costs and reduce the size of the printer and increase the reliability of the printer, the concept of scanning multiple laser beams with a single scanning mirror has been implemented.

A typical polygonal mirror for use in a multi-beam scanning unit typically has a height dimension of no more than about 2 mm at the reflective facets of the mirror, and laser diodes for such applications are typically mounted in a cylindrical housing having an outer diameter dimension greater than 5 mm. In order to image multiple imaging beams onto a single polygonal mirror simultaneously, for example, by positioning light sources adjacent to each other in a cross-scan direction, it is necessary to direct the beams onto the mirror facets at some non-parallel angle relative to the axis of rotation of the polygonal mirror. However, as this angle becomes larger, the error caused by facet to facet manufacturing tolerances of the mirror creates a shift in the focal location of the image formed at the photoconductive drum, resulting in a print quality defect. Accordingly, it is desirable to position the adjacent light sources and corresponding collimation lenses with a spacing in the cross-scan direction that is as close as possible, while maintaining a capability to adjust the axes of the light beams to direct the light beams to predetermined locations relative to the polygonal mirror.

SUMMARY OF THE INVENTION

The present invention provides a collimation assembly which has a compact construction in the cross-scan direction, and which provides for alignment of adjacent laser light sources relative to collimation lenses in a multi-beamed laser scanner.

In accordance with one aspect of the invention, a collimation assembly is disclosed for a multi-beamed scanner including a printhead housing and having a scanning element for scanning a light beam and a pre-scan assembly for transmitting a received light beam to the scanning element. The collimation assembly includes a collimation housing mounted to the printhead housing, at least two adjustment brackets supported on the collimation housing and a laser light source supported by each of the adjustment brackets, each of the light sources defining a respective light beam axis. At least two collimation lenses are also provided, each collimation lens supported in the collimation housing and intersected by one of the light beam axes. Each of the adjustment brackets is movable relative to the collimation housing to locate each of the light beam axes at a predetermined position relative to a respective collimation lens.

In accordance with another aspect of the invention, a collimation assembly is disclosed for a multi-beamed scanner including a printhead housing and having a scanning element for scanning a light beam and a pre-scan assembly for transmitting a received light beam to the scanning element. The collimation assembly includes a collimation housing mounted to the printhead housing and at least two adjustment brackets supported on the collimation housing, each of the adjustment brackets including a mount member. A light source is supported within each of the mount members, each of the light sources defining a respective light beam axis, and each of the light sources being adjustable relative to a respective mount member in a direction parallel to the light beam axes. At least two collimation lenses are also provided, each collimation lens supported in the collimation housing and intersected by one of the light beam axes. Each of the adjustment brackets is movable relative to the collimation housing to locate each of the light beam axes at a predetermined position relative to a respective collimation lens.

In accordance with a further aspect of the invention, a multi-beamed scanner is provided including a printhead housing and a scanning element for scanning a light beam and a pre-scan assembly for transmitting a received light beam to the scanning element, and including a collimation assembly. The collimation assembly includes a collimation housing mounted to the printhead housing and at least two adjustment brackets supported on the collimation housing and located adjacent to each other in a cross-scan direction. Each of the adjustment brackets includes a mount member and a light source is supported within each of the mount members, each of the light sources defining a respective light beam axis. At least two collimation lenses are also provided, each collimation lens supported in the collimation housing and intersected by one of the light beam axes. Each of the adjustment brackets is movable relative to the collimation housing in a scan direction and in the cross-scan direction to locate each of the light beam axes at a predetermined position relative to a respective collimation lens.

BRIEF DESCRIPTION OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
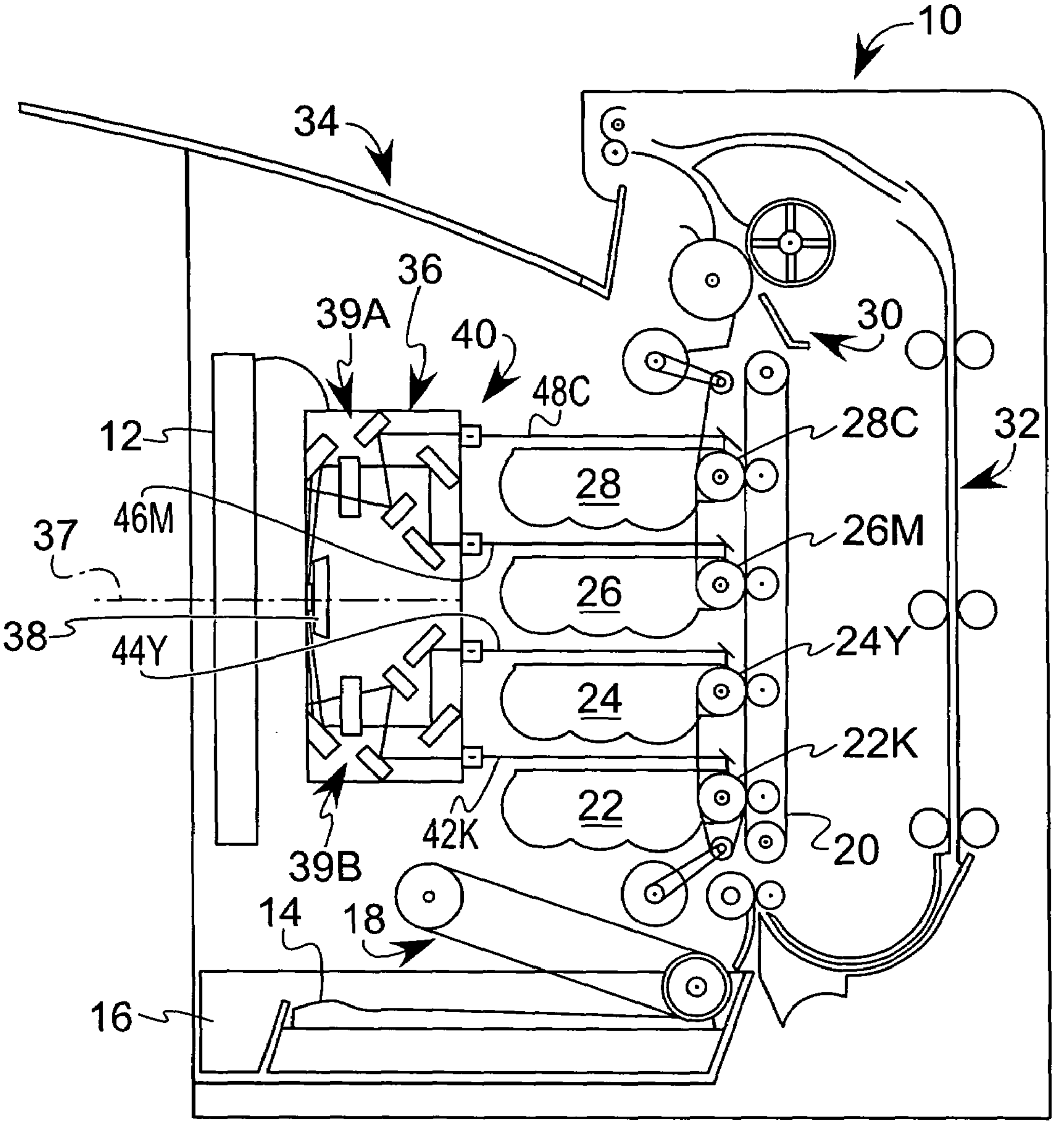
FIG. 1 is a side, schematic view of an exemplary electrophotographic imaging apparatus according to an embodiment of the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24Y that delivers yellow toner to the sheet 14 in a pattern corresponding to the yellow image plane of the image being printed. The image forming station 26 includes a photoconductive drum 26M that delivers magenta toner to the sheet 14 in a pattern corresponding to the magenta image plane of the image being printed. The image forming station 28 includes a photoconductive drum 28C that delivers cyan toner to the sheet 14 in a pattern corresponding to the cyan image plane of the image being printed. The controller 12 regulates the speed of the media transport belt 20, media pick timing and the timing of the image forming stations 22, 24, 26, 28 to effect proper registration and alignment of the different image planes to the sheet 14.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

Figure 2:
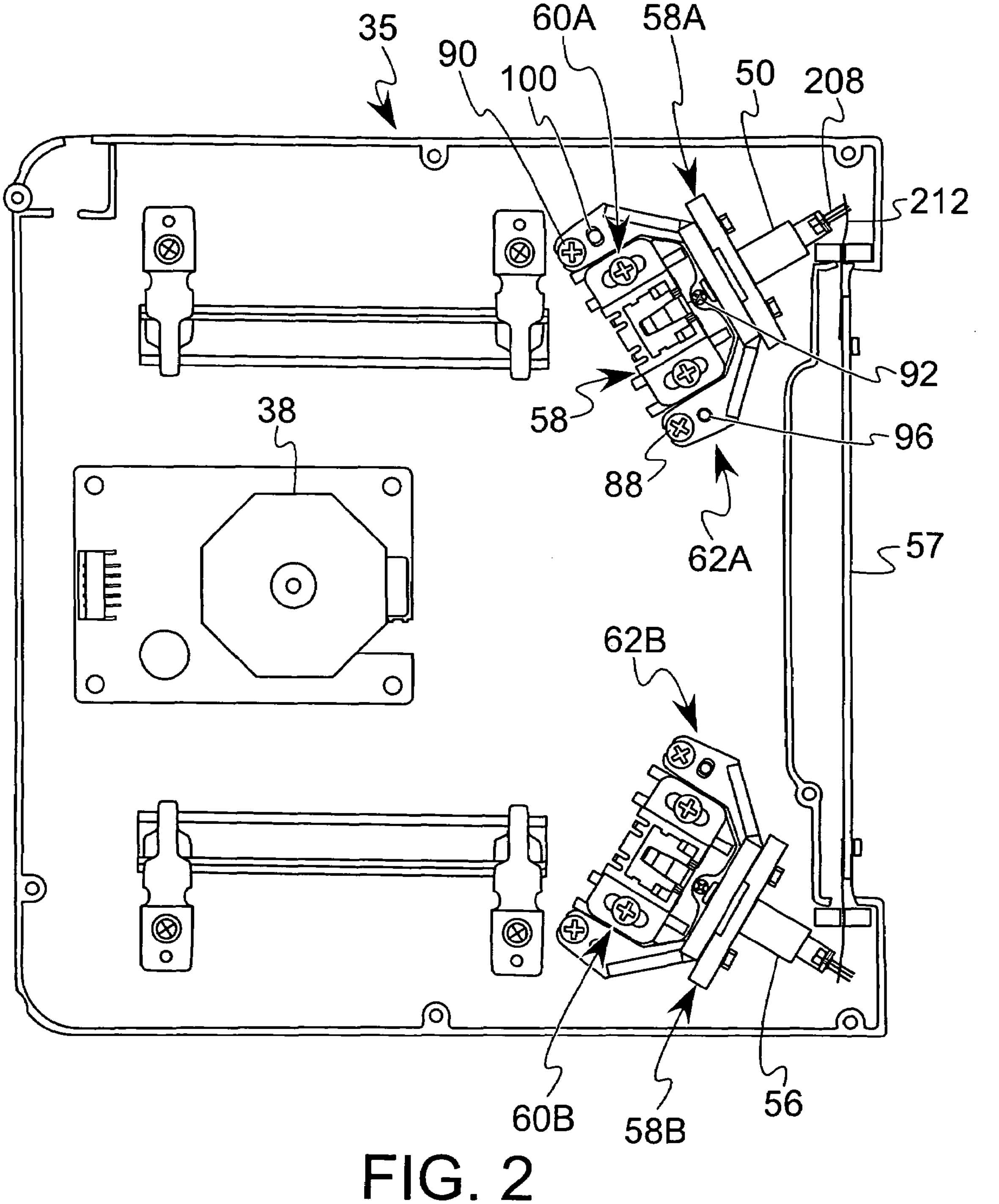
FIG. 2 is plan view illustrating a printhead incorporating two of the collimation assemblies of the present invention.

To effect the imaging operation, the controller 12 manipulates and converts data defining each of the CYMK image planes into separate corresponding laser pulse video signals, and the video signals are then communicated to a printhead 36. The printhead 36 comprises a printhead housing 35 (see FIG. 2), which is preferably formed as a molded component. The printhead 36 includes four laser light sources comprising laser light source pairs 50, 52 and 54, 56 associated with respective collimation assemblies 58A and 58B (see FIGS. 2 and 3), and a pair of pre-scan lens assemblies 60A and 60B associated with the collimation assemblies 58A and 58B, where the associated collimation assemblies 58A, 58B and pre-scan lens assemblies 60A, 60B define pre-scan optical systems 62A and 62B. The printhead 36 additionally includes a single polygonal mirror 38 supported for rotation about a rotational axis 37, and post-scan optical systems 39A and 39B receiving the light beams emitted from the laser light sources 50, 52, 54, 56 and passing through the pre-scan optical systems 62A, 62B. The optics comprising the pre-scan optical systems 62A, 62B and post-scan optical systems 39A, 39B are referred to generally herein as the optical system 40. Each laser of the laser light sources 50, 52, 54, 56 generates a laser beam that is modulated according to an associated one of the video signals from the controller 12, as provided through a laser driver circuit board 57. In particular, laser light source 52 emits a laser beam 48C that is modulated according to a video signal corresponding to the cyan image plane. Laser light source 50 emits a laser beam 46M that is modulated according to a video signal corresponding to the magenta image plane. Laser light source 54 emits a laser beam 44Y that is modulated according to a video signal corresponding to the yellow image plane. Similarly, Laser light source 56 emits a laser beam 42K that is modulated according to a video signal corresponding to the black image plane.

Each laser beam 42K, 44Y, 46M, 48C is reflected off the rotating polygonal mirror 38 and is directed towards a corresponding one of the photoconductive drums 22K, 24Y, 26M and 28C by select lenses and mirrors in the post-scan optical systems 39A, 39B. The rotation of the polygonal mirror 38 and positioning of the post-scan optics 39A, 39B causes each laser beam 42K, 44Y, 46M, 48C to sweep generally, in a scan direction, which is perpendicular to the plane of FIG. 1, across its corresponding photoconductive drum 22K, 24Y, 26M and 28C so as to form an image thereon.

As described above, each collimation assembly 58A, 58B has a pre-scan assembly 60A, 60B associated with it, located between the respective collimation assembly 58A, 58B and the polygonal mirror 38. The pre-scan assemblies 60A, 60B operate to focus and converge the pair of laser light beams emitted from the respective pairs of lasers 50, 52 and 54, 56 in a cross-scan direction at or near the mirror facet surface of the polygonal mirror 38 to allow each pair of light beams to be scanned by the same polygonal mirror facet. The present invention is directed to providing a collimation assembly which facilitates positioning the individual laser light sources of each laser light source pair 50, 52 and 54, 56 closely adjacent to each other while maintaining the capability to adjust the position of the beams output by the laser light sources 50, 52, 54, 56. The collimation assemblies 58A, 58B comprise substantially identical constructions, and the components and operation of the collimation assemblies 58A, 58B will be described with particular reference to the collimation assembly 58A, it being understood that the description is equally applicable to the collimation assembly 58B.

Figure 4:
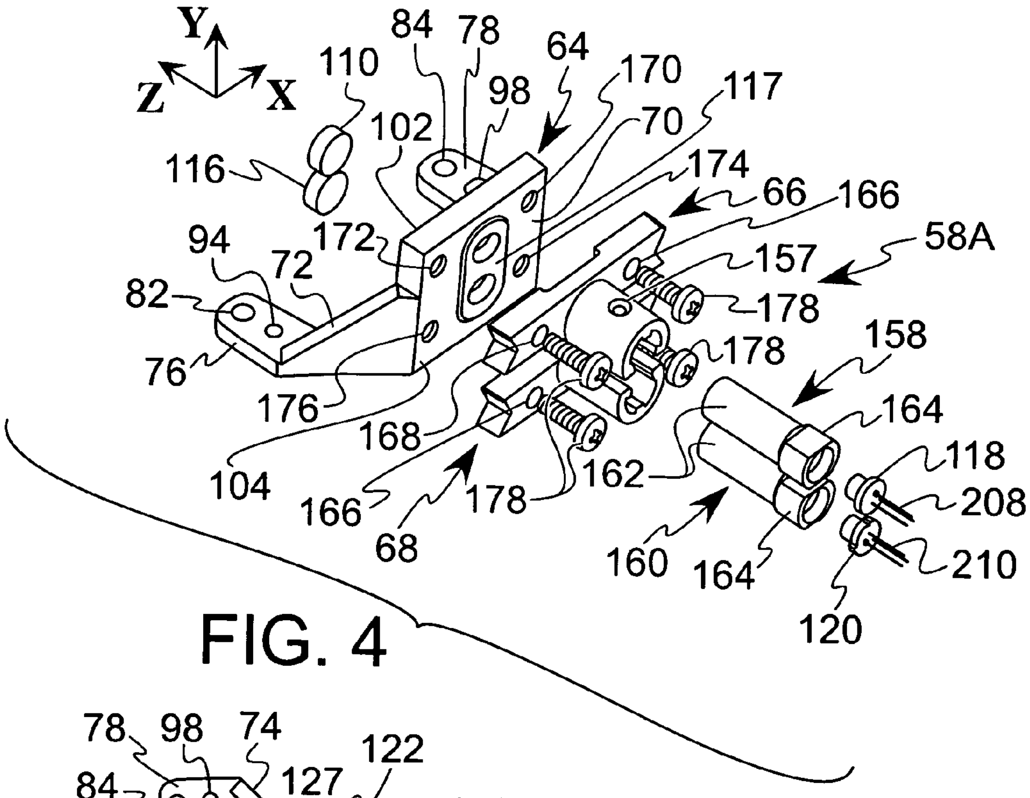
FIG. 4 is an exploded perspective view of one of the collimation assemblies.
Figure 6:
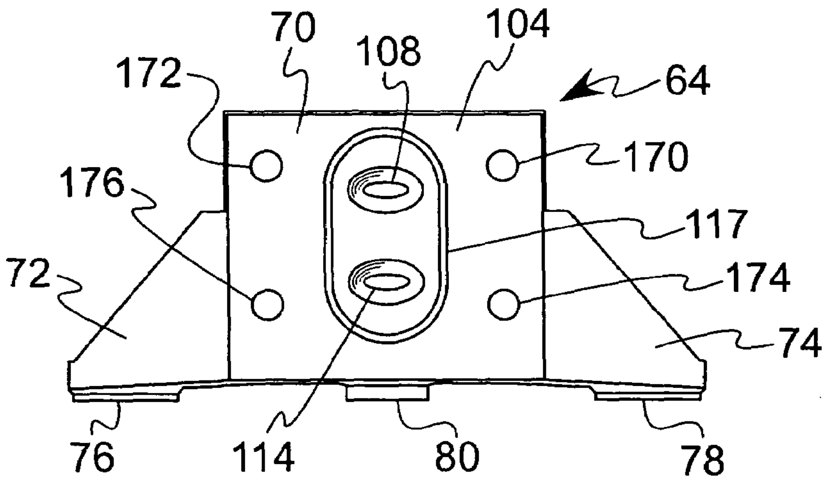
FIG. 6 is an elevation view of a rear side of a collimation housing for the collimation assembly.
Figure 7:
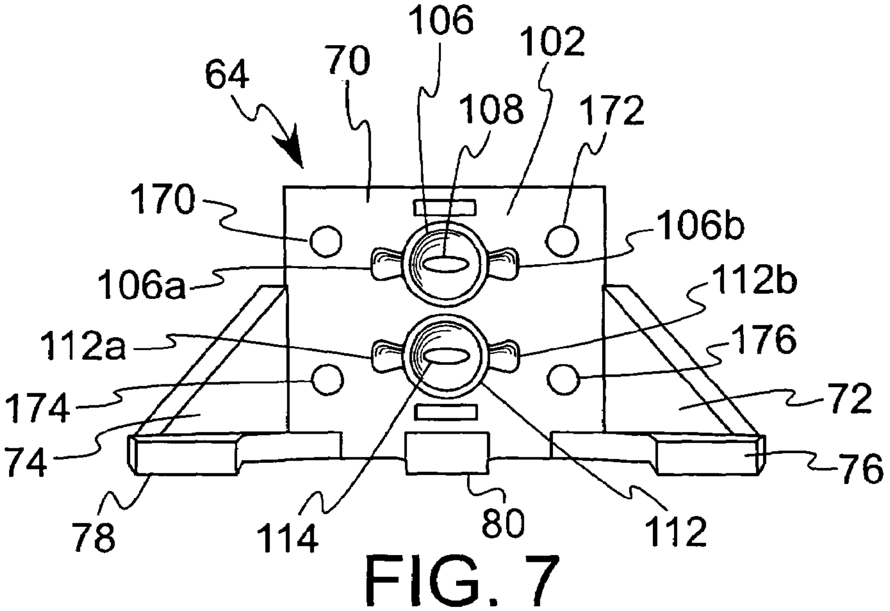
FIG. 7 is an elevation view of a front side of the collimation housing for the collimation assembly.

Referring to FIG. 4, the collimation assembly 58A comprises a collimation housing 64 supporting an upper adjustment bracket 66 and a lower adjustment bracket 68 adjacent to each other. Referring further to FIGS. 6 and 7, the collimation housing 64 includes a support plate 70, side plates 72, 74 extending at an angle outwardly from either side of the support plate 70, and a base portion comprising side base plates 76,78 extending from the lower portions of side plates 72, 74 and a central base plate 80 extending from a central lower portion of the support plate 70 (see also FIG. 5). The side base plates 76, 78 and central base plate 80 each include a respective aperture 82, 84, 86 for receiving a respective fastener 88, 90, 92 (FIG. 2) for attaching the collimation assembly 58A to mounting datum surfaces of the printhead housing 35. The side base plate 76 additionally includes an aperture 94 for receiving an alignment peg 96 molded into the printhead housing 35, and the side base plate 78 includes a slot 98 for receiving an alignment peg 100 molded into the housing 35. The engagement of the aperture 94 and slot 98 with the alignment pegs 96, 100 facilitates alignment of the collimation housing 64 in the scan direction, and attachment of the fasteners 88, 90, 92 orients the collimation assembly 58A in a predetermined alignment in the cross-scan direction.

The support plate 70 includes a front side 102 and a rear side 104. As seen in FIG. 7, the front side 102 is formed with an upper collimation lens pocket 106 surrounding a light beam aperture 108 and is adapted to receive an upper collimation lens 110 (FIG. 4). Similarly, a lower collimation lens pocket 112 is formed on the front side 102 and surrounds a lower light beam aperture 114 and is adapted to receive a lower collimation lens 116. The upper and lower lenses 110, 116 are retained in the respective pockets 106, 112 by an adhesive or similar means applied at recesses 106*a*, 106*b* and 112*a*, 112*b* on either side of the pockets 106, 112. The rear side 104 of the support plate 70 includes a raised area 117 which extends around the apertures 108 and 114. The apertures 108, 114 are formed with an elliptical shape and are located between the collimation lenses 110, 116 and respective light sources 50, 52 comprising laser diodes 118, 120 (FIG. 4) to prevent or minimize stray light from one diode light source becoming imaged into the collimation lens for the adjacent diode light source, which could result in undesirable optical "cross-talk" between the video signals of the two adjacent light beams.

The adjustment brackets 66, 68 are formed with identical construction, and are described with reference to FIGS. 8 and 9. The adjustment brackets 66, 68 each include a generally planar adjustment plate 122 formed as an elongated rectangular member having front and rear faces 124, 126 and first and second elongated edges 128, 130 connecting the front and rear faces 124, 126. The front face 124 includes a recessed planar central portion 125 located below a plane defined by adjacent planar lateral portions 127, 129. In addition, first and second end portions 132, 134 extend between the front and rear faces 124, 126 at opposing ends of the adjustment brackets 66, 68. The first and second end portions 132, 134 are each formed with an inwardly extending V-shape for receiving a gripping member for an alignment operation, as will be described further below.

The adjustment brackets 66, 68 each include a generally tubular mount member 136 beginning adjacent the front face 124 and extending rearwardly past the rear face 126, and defining an outer surface 138 and an inner surface 140. The mount member 136 is formed with a generally circular cross-section having an outer diameter which is greater than the height of the adjustment plate 122, as measured between the first and second elongated edges 128, 130 (see FIG. 10). The mount member 136 is located such that the outer surface 138 is located adjacent the first elongated edge 128, and a diametrically opposite portion 142 of the mount member 136 extends beyond the second elongated edge 130. An elongated slot portion 144 extends longitudinally along the diametrically opposite portion 142 of the mount member 136, extending from the adjustment plate 122 to a distal end 146 of the mount member 136. The slot portion 144 is defined between generally planar edges 148, 150 of the mount member 136, and the edges 148, 150 define a plane which is substantially tangential to a diameter defined by the inner surface 140. Additionally, the inner surface 140 of the mount members 136 includes three longitudinally extending ribs 152, 154, 156 spaced apart approximately 120°, in a circumferential direction, and extending radially inwardly from the inner surface 140. In order to ensure rigidity of the mount members 136, the adjustment brackets 66, 68 are preferably formed of a reinforced plastic, such as a glass reinforced plastic, or of a cast metallic alloy such as zinc or aluminum. It should be noted that the mount members 136 may be provided with other cross-sectional shapes, such as an elliptical shape, to improve the optical quality of the light beams.

The mount member 136 of the upper adjustment bracket 66 receives the laser light source 50 comprising a laser diode holder 158 and the laser diode 118. Similarly, the mount member 136 of the lower adjustment bracket 68 receives the laser light source 52 comprising a laser diode holder 160 and the laser diode 120. Each laser diode holder 158, 160 includes a hollow cylindrical barrel 162, and a collar 164 located at one end of the barrel 162. The collars 164 of the laser diode holders 158, 160 are sized to receive a respective laser diode 118, 120 in a press friction fit.

Referring to FIG. 4, the laser diode holders 158, 160 are received and supported in the mount members 136 of the respective adjustment brackets 66 and 68. The barrels 162 of the laser diode holders 66, 68 are supported on the ribs 152, 154, 156 for sliding movement in a direction parallel to the longitudinal axis of the mount members 136 and parallel to the axes of the light beams produced by the laser diodes 118, 120. A space is defined in each of the mount members 136 between the inner surface 140 of the mount member 136 and the outer surface of the laser diode holder 158, 160. The mount members 136 each include an aperture 157 passing through the mount member 136 on a side opposite the slot portion 144. The apertures 157 are provided to allow application of an adhesive into the space defined in the mount members 136 to permanently locate the laser diode holders 158, 160 relative to the mount members 136 after the laser diode holders 158, 160 are adjusted in the process direction, parallel to the axes of the light beams, to provide a desired spot size for each of the light beams emitted from collimation assembly 58A.

Figure 10:
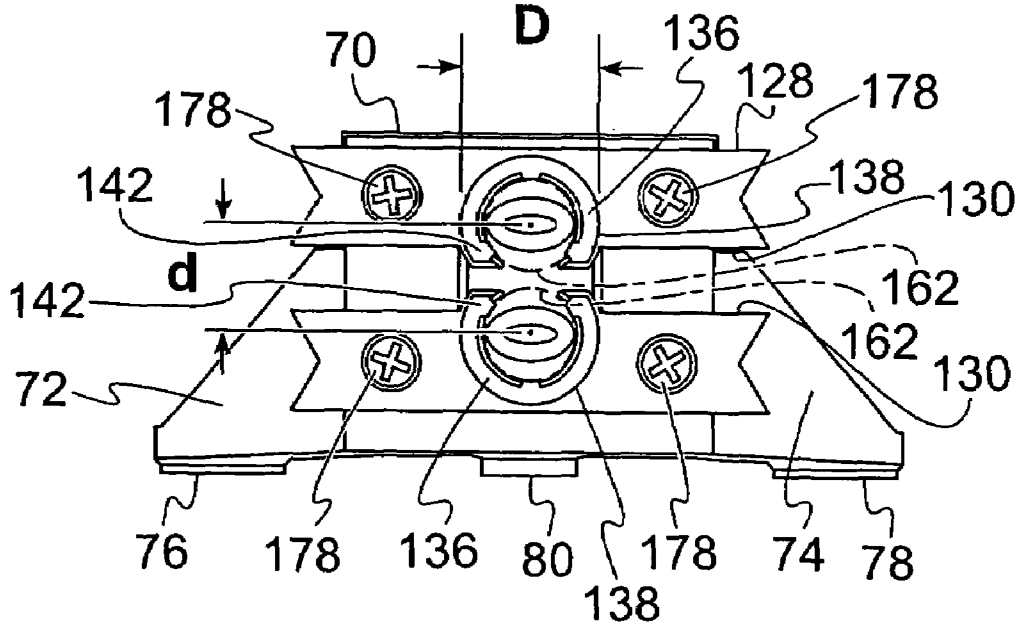
FIG. 10 is an elevation view of the rear side of the collimation housing having the adjustment brackets mounted in place and showing the outline of a barrel portion of the laser diode holders in phantom lines.

The upper and lower adjustment brackets 66, 68 are supported on the support plate 70 with their second longitudinal edges 130 facing each other (FIG. 10), such that the slot portions 144 of the mount members 136 are located adjacent to each other. The slot portions 144 define cut-away sections at the portions 142 of the mount members 136 which permit the adjacent portions of the adjustment brackets 66, 68 to be located at a closer spacing than if the slot portions 144 were not provided. The closer spacing of the adjustment brackets 66, 68 positions the laser diodes 118, 120, and the corresponding light beam axes, at a closer spacing such that the laser light beams emitted from the collimation assembly will have a smaller angle of incidence at the polygonal mirror 38 in the cross-scan direction, thereby reducing the effects of manufacturing variations at the facets of the polygonal mirror 38 on the resulting imaging operation. The close spacing of the adjustment brackets is illustrated in FIG. 10 in which it can seen that, as a result of providing an area of reduced material where the mount members 136 of the upper and lower adjustment brackets 66, 68 face each other, the centers of the laser diodes 118, 120 may be positioned at a spacing d which is less than an outer diameter D defined by the mount members 136, i.e., less than the combined radii of the two adjacent mount members 136.

Figure 5:
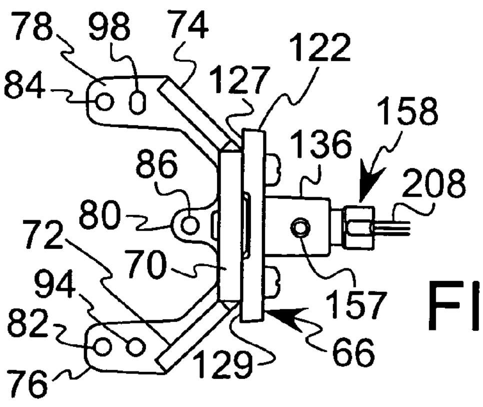
FIG. 5 is a top plan view of one of the collimation assemblies.

Referring to FIG. 5, the front face 124 of each adjustment bracket 66, 68 is supported with the planar lateral portions 127, 129 positioned in contact with the rear side 104 of the support plate 70. It should be noted that the central portion 125 of the front face 124 of each adjustment bracket 66, 68 provides a clearance between the adjustment brackets 66, 68 and the raised portion 117 of the rear side 104 of the support plate 70. Further, the lateral dimension of the raised portion 117 is less than the lateral dimension of the recessed central portions 125 of the adjustment brackets 66, 68 to accommodate movement of the adjustment brackets 66, 68 in the lateral direction.

Figure 8:
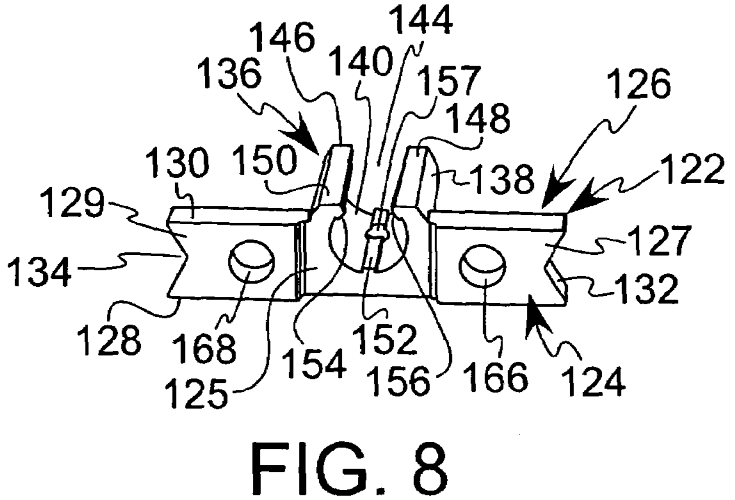
FIG. 8. is a perspective view of one of the adjustment brackets for the collimation assembly.
Figure 9:
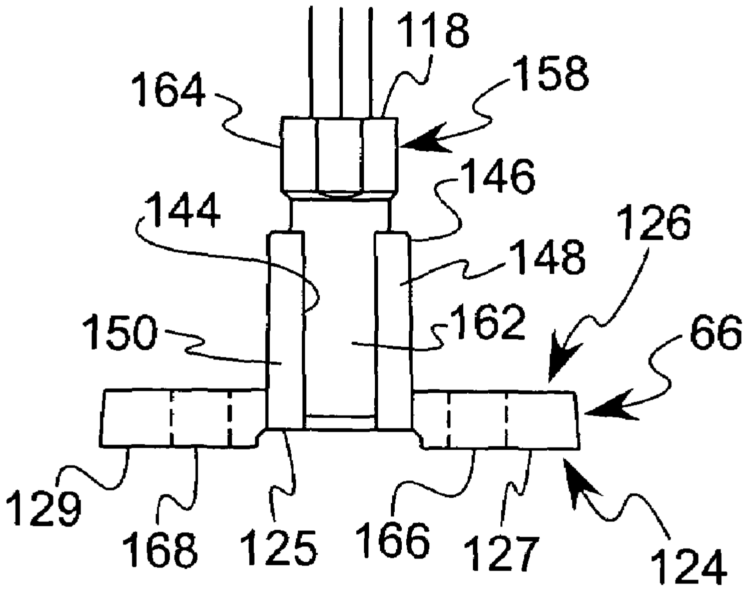
FIG. 9 is a bottom plan view of an upper adjustment bracket for the collimation assembly including a laser diode holder mounted to the adjustment bracket.

Referring further to FIGS. 8 and 9, the adjustment brackets 66, 68 each include a pair of mounting holes 166, 168, and the support plate 70 includes corresponding upper and lower sets of threaded holes 170, 172 and 174, 176. The adjustment brackets 66, 68 are held to the support plate 70 by screws 178 which pass through the mounting holes 166, 168 and threadably engage within the threaded support plate holes 170, 172 and 174, 176. The holes 166, 168 of the mounting brackets 66, 68 are oversized relative to the diameter of the screws 178 to permit movement of the adjustment brackets 66, 68 along two axes parallel to the plane of the support plate 70 and perpendicular to the axes of the light beams emitted by the laser diodes 118, 120. The movement of the adjustment brackets 66, 68 relative to the support plate 70 provides for adjustment of the axes of the light beams emitted by the laser diodes 118, 120 relative to their respective collimation lenses 110, 116, in order to compensate for manufacturing variations of the components of the collimation assembly 58A. In a preferred embodiment, the difference in diameter between the adjustment bracket holes 166, 168 and the screws 178 is approximately 1 mm, which provides adequate adjustment to align the laser light beams emitted through the collimation lenses 110, 116 on a vector parallel to a plane defined by mounting points in the printhead 35 engaged by the side base plates 76, 78 and central base plate 80 for supporting the collimation housing 64.

Figure 11:
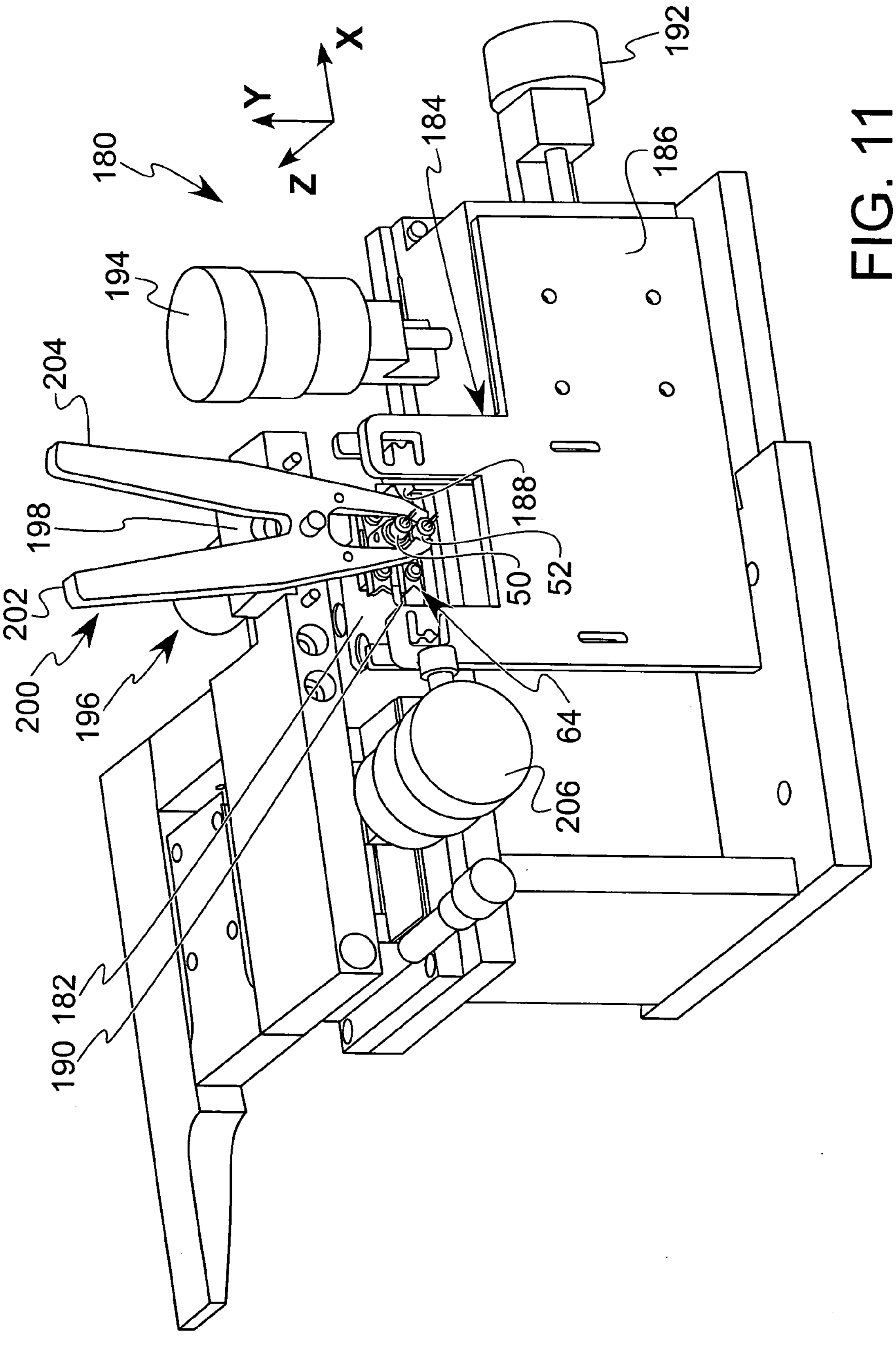
FIG. 11 is a diagrammatic perspective view of an adjustment fixture used for an alignment operation of the components of the collimation assembly.

Referring to FIG. 11, an exemplary diagram of an adjustment fixture 180 for adjusting the adjustment brackets 66, 68 and laser diode holders 158, 160 to precisely adjusted locations in the collimation assembly 58A is shown. The collimation housing 64 is mounted to a datum plate 182 of the fixture 180 by engagement of side base plates 76, 78 and central base plate 80 to the datum plate 182. An x-y axis adjuster 184 is supported for precisely controlled movement relative to the datum plate 182 and comprises a plate member 186 having gripper members 188, 190 for engaging the V-shaped end portions 132, 134, movable in an x-axis direction by a micrometer knob 192 and movable in a y-axis direction by a micrometer knob 194. It should be noted that the adjustment bracket end portions 132, 134 may formed with other shapes or configurations, such as an outwardly extending V-shape, to cooperate with a corresponding shape on the engaging surfaces of the gripper members 188, 190, or the gripper members 188, 190 may be provided with pins for engaging within holes formed in the adjustment brackets 66, 68.

The fixture 180 further includes a z-axis adjuster 196 comprising a plate member 198 supporting a diode holder clamp 200 having a pair of spring biased jaws 202, 204 adapted for clamping the laser diode holders 158, 160. The diode holder clamp 200 is movable in the z-axis direction by a micrometer knob 206.

The process of adjusting each of the adjustment brackets 66, 68 comprises loosely mounting an adjustment bracket 66, 68 to the support plate 70 with a pair of the screws 178 and engaging the end portions 132, 134 with the gripper members 188, 190. A power source (not shown) is connected to the leads of the laser diode 118, 120, and a device (not shown) for measuring beam size is positioned at a predetermined location from the collimation assembly 58A to detect and measure the beams emitted by the laser diodes 118, 120. The plate member 186 is moved in the x and y directions by operation of the micrometer knobs 192, 194 to individually move the adjustment brackets 66, 68 relative to their respective collimation lenses 110, 116 and align the vector of the light beam transmitted to the beam scan unit such that it is parallel to the plane of the datum plate 182. The screws 178 are then tightened to lock the aligned adjustment bracket 66, 68 in place. It should be noted that other methods of fixing the adjustment brackets 66, 68 in their final positions may be applied, such as through use of a UV activated adhesive or equivalent methods.

The process of adjusting the position of the laser diode holders 158, 160 in the z direction relative to the collimation lenses 110, 116 comprises individually gripping the laser diode holders 158, 160 in the jaws 202, 204 of the diode holder clamp 200 and operating the micrometer knob 206 to cause the light beams from the laser diodes 118, 120 to form predetermined spot sizes at the beam scan unit. An adhesive is then applied through the apertures 157 into the area between the laser diode holders 158, 160 and the inner surface 140 of the respective mount members 136 to fasten the laser diode holders 158, 160 in position relative to the mount members 136. It should be noted that the adjustment fixture 180 is shown only for illustrative purposes to describe the operation of aligning the adjustment brackets 66, 68 and the laser diode holders 158, 160, and that other fixtures or structures may be used with the collimation assembly of the present invention for performing the alignment operation.

Figure 3:
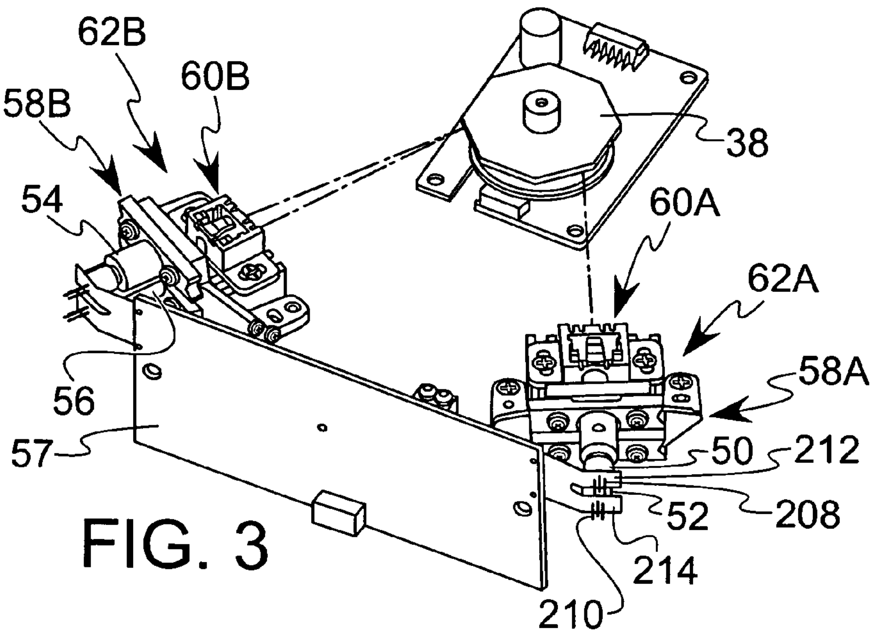
FIG. 3 is a diagrammatic perspective view of a portion of the printhead incorporating two of the collimation assemblies.

After alignment of adjustment brackets 66, 68 and laser diode holders 158, 160, the collimation assembly 58A is moved from the adjustment fixture 180 to the printhead 35 where the collimation assembly 58A is properly aligned to the printhead 35 by engagement of side base plates 76, 78 and central base plate 80 to the datum surfaces of the printhead 35. Laser pulse signals for powering the laser diodes 118, 120 are provided from the controller 12 to the laser driver circuit board 57 connected to respective leads 208, 210 extending from the laser diodes 118, 120 (FIG. 3). The leads 208, 210 each comprise three lead wires extending from the laser diodes 118, 120 and which are connected to flexible circuit leads 212, 214 extending from the rigid circuit board 57. The flexible circuit leads 212, 214 are defined by thin, non-rigid flat conductive strips which flex to accommodate the different positions the laser diodes 118, 120 may assume relative to the circuit board 57 as a result of the positional adjustment of the adjustment brackets 66, 68 and the laser diode holders 158, 160 relative to the collimation housing 64.

Having described the invention in detail and by reference to a preferred embodiment thereof, it will be apparent that modifications and variations are possible without departing from the scope of the invention defined in the appended claims.

What is claimed is:

1. A collimation assembly for a multi-beamed scanner including a printhead housing and having a scanning element for scanning a light beam and a pre-scan assembly for transmitting a received light beam to said scanning element, said collimation assembly comprising:

- a collimation housing mounted to said printhead housing;
- at least two adjustment brackets supported on said collimation housing;
- a light source supported by each of said adjustment brackets, each said light source defining a respective light beam axis;
- at least two collimation lenses, each collimation lens supported in said collimation housing and intersected by one of said light beam axes;
- each of said adjustment brackets being movable relative to said collimation housing to locate each of said light beam axes at a predetermined position relative to a respective collimation lens; and
- each said light source being supported by a corresponding one of said adjustment brackets for movement in a direction parallel to said light beam axes.

2. The collimation assembly of claim 1 wherein each said adjustment bracket is movable relative to said collimation housing along two axes of movement transverse to said light beam axes.

3. The collimation assembly of claim 2 including holes defined through each said adjustment bracket and fasteners extending through said holes to attach said adjustment brackets to said collimation housing, said holes comprising oversized holes for accommodating adjustment of said adjustment brackets relative to said collimation housing.

4. The collimation assembly of claim 1 including a circuit board mounted to said printhead housing and flexible circuit leads extending from said circuit board, said light sources including lead wires connected to said flexible circuit leads for powering said light sources.

5. The collimation assembly of claim 1 wherein each said adjustment bracket includes a generally tubular mount member receiving said light source in sliding relation for adjustment of said distance between said light source and said collimation lens.

6. The collimation assembly of claim 5 including a plurality of ribs extending within said mount members for engaging said light source and providing a clearance space between an exterior of said light source and an inner wall of said mount member.

7. The collimation assembly of claim 5 wherein each said mount member includes a slot portion extending the length of said mount member, said slot portions of said mount members being located in facing relationship to each other.

8. The collimation assembly of claim 7 wherein said mount members each define an outer diameter and the distance between said light axes is less than said outer diameter of said mount members.

9. A collimation assembly for a multi-beamed scanner including a printhead housing and having a scanning element for scanning a light beam and a pre-scan assembly for transmitting a received light beam to said scanning element, said collimation assembly comprising:

- a collimation housing mounted to said printhead housing;
- at least two adjustment brackets supported on said collimation housing, each said adjustment bracket including a mount member;
- a light source supported within each said mount member, each said light source defining a respective light beam axis, and each said light source being adjustable relative to a respective mount member in a direction parallel to said light beam axes;
- at least two collimation lenses, each said collimation lens supported in said collimation housing and intersected by one of said light beam axes; and
- each of said adjustment brackets being movable relative to said collimation housing to locate each of said light beam axes at a predetermined position relative to a respective collimation lens.

10. The collimation assembly of claim 9 including a circuit board mounted to said printhead housing and flexible circuit leads extending from said circuit board, said light sources including lead wires connected to said flexible circuit leads for powering said light sources.

11. The collimation assembly of claim 9 wherein said mount members each define an outer diameter and the distance between said light axes is less said outer diameter of said mount members.

12. The collimation assembly of claim 9 wherein each said adjustment bracket includes mounting holes and a fastener through each of said mounting holes for mounting said adjustment brackets to said collimation housing, said mounting holes comprising oversized holes for accommodating adjustment of said adjustment brackets along two axes of movement transverse to said light beam axes.

13. The collimation assembly of claim 12 wherein said mount members each define an outer diameter and the distance between said light axes is less than said outer diameter of said mount members.

14. The collimation assembly of claim 13 wherein each said mount member includes a slot portion extending the length of said mount member, said slot portions of said mount members being located in facing relationship to each other.

15. The collimation assembly of claim 9 wherein said adjustment brackets are located adjacent to each other in a cross-scan direction.

16. In a multi-beamed scanner including a printhead housing and a scanning element for scanning a light beam and a pre-scan assembly for transmitting a received light beam to said scanning element, a collimation assembly comprising:

a collimation housing mounted to said printhead housing;

at least two adjustment brackets supported on said collimation housing and located adjacent to each other in a cross-scan direction, each said adjustment bracket including a mount member;

a light source supported within each said mount member, each said light source defining a respective light beam axis;

at least two collimation lenses, each said collimation lens supported in said collimation housing and intersected by one of said light beam axes;

each of said adjustment brackets being movable relative to said collimation housing in a scan direction and in the cross-scan direction to locate each of said light beam axes at predetermined positions relative to a respective collimation lens; and said mount members each defining an outer diameter and the distance between said light axes is less than said outer diameter of said mount members.

17. The multi-beamed scanner of claim 16 including a circuit board mounted to said printhead housing and flexible circuit leads extending from said circuit board, said light sources including lead wires connected to said flexible circuit leads for powering said light sources.

18. The multi-beamed scanner of claim 16 wherein each said light source is adjustable relative to a respective mount member in a direction parallel to said light beam axes.

* * * * *